United States Patent

Pickett

[15] 3,680,596

[45] Aug. 1, 1972

[54] RESILIENT SEAL SPOOL VALVE

[72] Inventor: David A. Pickett, Warren, Mich.

[73] Assignee: Ross Operating Valve Company, Detroit, Mich.

[22] Filed: Dec. 28, 1970

[21] Appl. No.: 101,986

[52] U.S. Cl. ....................137/625.69, 251/172

[51] Int. Cl. ....................F16h 11/07

[58] Field of Search.......137/625.69, 625.25, 625.48, 137/625.64, 625.63; 251/172, DIG. 1, 368

[56] References Cited

UNITED STATES PATENTS

| | | | |
|---|---|---|---|
| 3,283,784 | 11/1966 | Ruchser | 137/625.64 |
| 3,329,159 | 7/1967 | Herion | 137/625.63 X |
| 743,985 | 11/1903 | Koelkebeck | 137/625.69 |

FOREIGN PATENTS OR APPLICATIONS

| | | | |
|---|---|---|---|
| 1,141,238 | 2/1956 | France | 137/625.48 |
| 975,107 | 2/1942 | France | 137/625.69 |
| 1,173,092 | 3/1957 | France | 137/625.69 |
| 311,166 | 5/1929 | Great Britain | 137/625.69 |

*Primary Examiner*—M. Cary Nelson
*Assistant Examiner*—Robert J. Miller
*Attorney*—Harness, Dickey & Pierce

[57] ABSTRACT

A spool valve having a body, spool and liner. The liner comprises a plurality of spacer-seal members between the body and spool. These members are of low friction material and interfit, having spool engaging lips which are pressure assisted toward their sealing position. In another embodiment, the spool has members of low friction material which engage lands in the body and have pressure assisted sealing lips.

8 Claims, 8 Drawing Figures

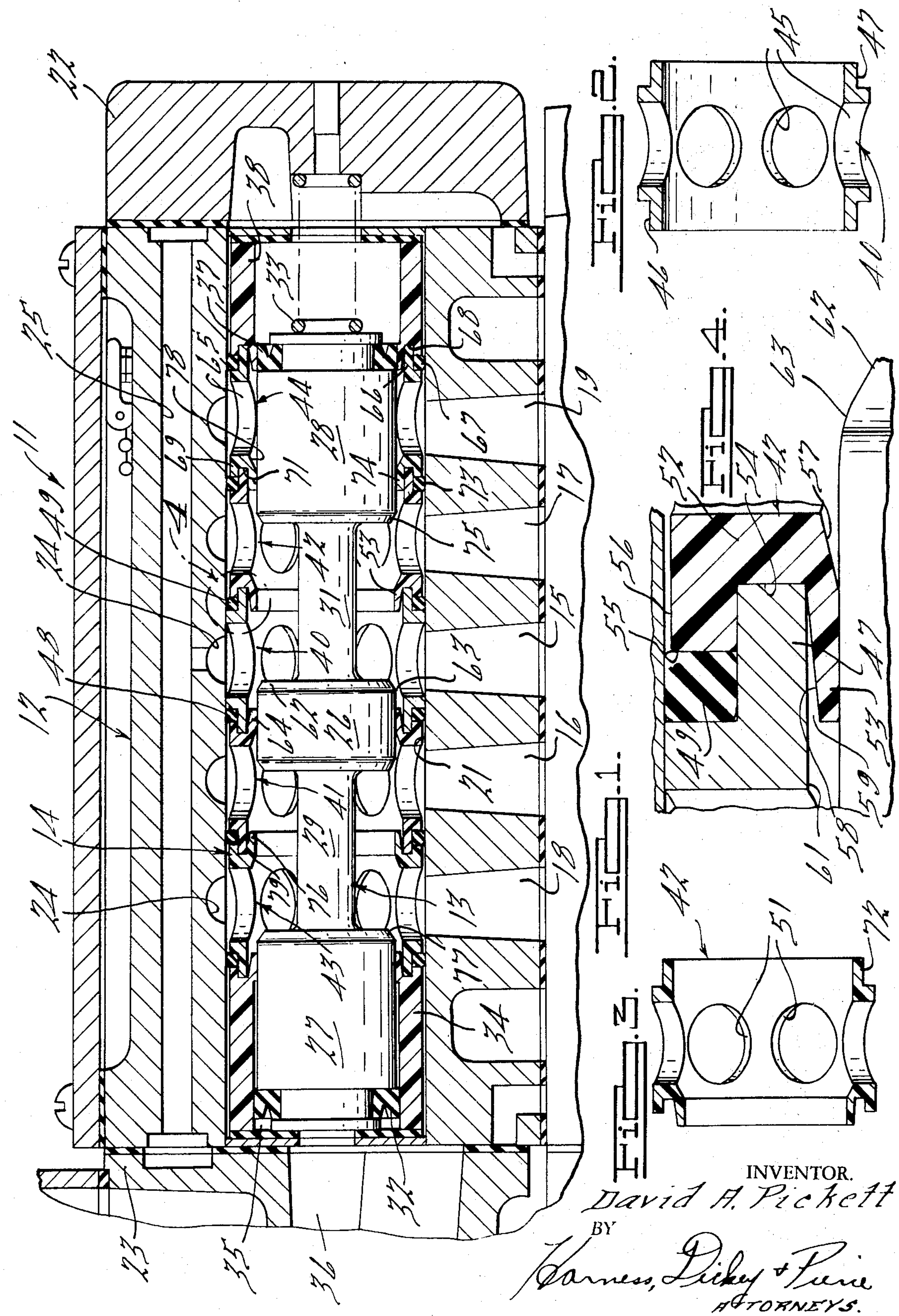
INVENTOR.
David A. Pickett
BY
Harness, Dickey & Pierce
ATTORNEYS.

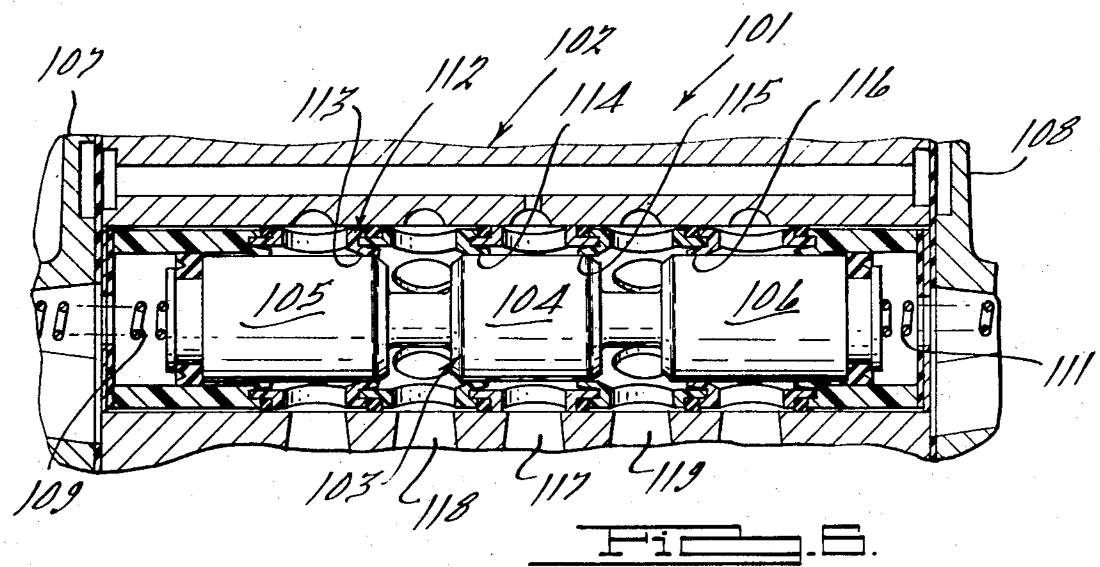
FIG. 6.
FIG. 8.
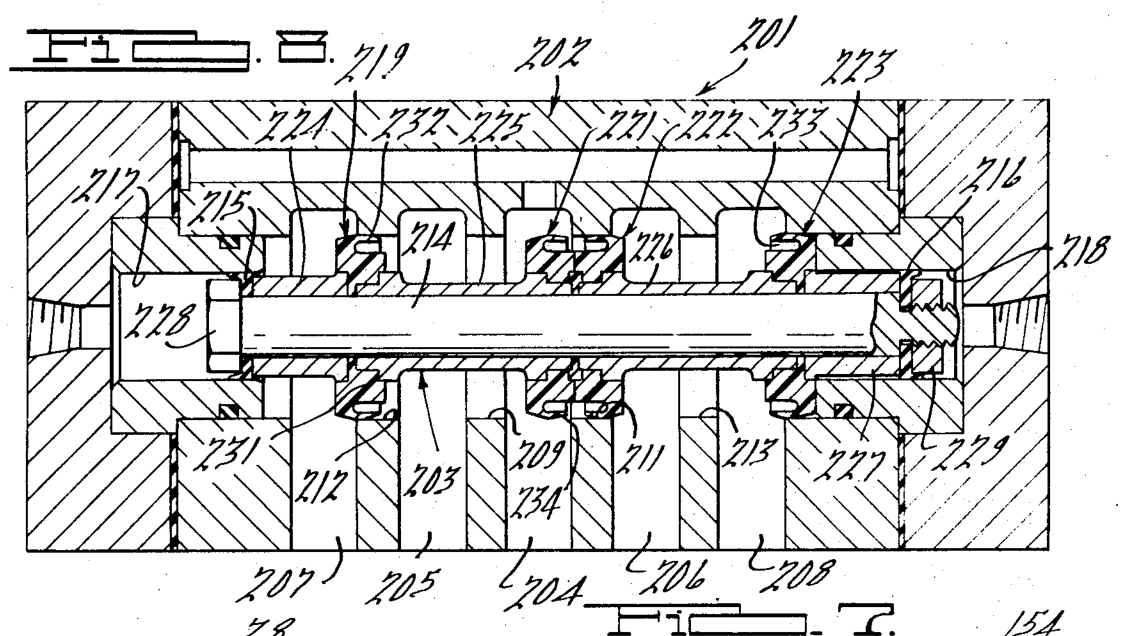
FIG. 7.
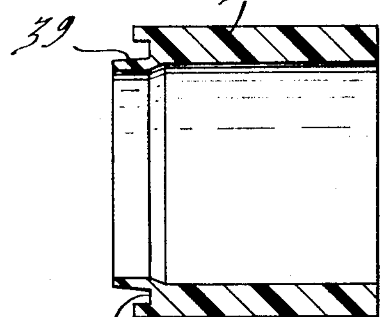
FIG. 5.
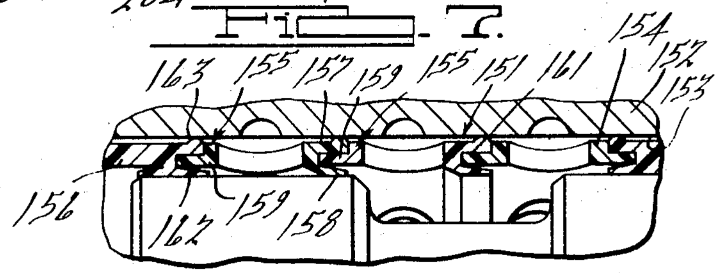
INVENTOR.
David A. Pickett
BY
Harness, Dickey & Pierce
ATTORNEYS.

RESILIENT SEAL SPOOL VALVE

BACKGROUND OF THE INVENTION

1. Field of the Invention

The invention relates to spool valves in which coacting surfaces carried by the body and spool form fluid seals at the various valve positions.

2. Description of the Prior Art

Conventionally valves of this type have spacers in stacked relation between the body and spool, with O-rings interposed between the spacers and engageable with the spool on their inside diameters. These known constructions have a number of disadvantages, including relatively high costs and the existence of friction between the O-rings and the spool. The necessity of providing a metal-to-seal between the spacer sections and body increases the manufacturing cost of such units. The performance life of these conventional constructions is also limited because of frictional wear on the O-rings.

There are examples in the prior art of pressure assisted seals, such as those shown in Tomoser U.S. Pat. No. 2,602,592 and Ocampo U.S. Pat. No. 2,970,802. However, the applicant is unaware of the specific combination of pressure assisted seals as described herein with spool valve elements to achieve the purposes set forth.

BRIEF SUMMARY OF THE INVENTION

The illustrated embodiments of the invention show body and spool members with one of said members carrying a plurality of pressure assisted seals engageable with the other member. The seal comprises an annular member fabricated of a low friction material such as Teflon and having a mounting portion and a sealing portion. An annular groove is formed between these portions which is exposed to a fluid chamber under pressure. The seal is movable relative to a land on the other member, and the sealing portion thereof has at least one chamfered surface which will ride up on the land when the seal is being made.

In one embodiment of the invention, the seals comprise spacer-seal members in stacked relation to form a liner between the spool and body, being held in fixed position with respect to the body. Another embodiment has the seal members carried by the spool and engageable directly with lands in the body.

BRIEF DESCRIPTION OF THE DRAWINGS

FIG. 1 is a cross-sectional view in elevation showing a first embodiment of the invention with spacer-seal members forming a liner;

FIG. 2 is an enlarged cross-sectional view in elevation of the central liner member;

FIG. 3 is an enlarged cross-sectional view in elevation of one of the spacer-seal members;

FIG. 4 is an enlarged fragmentary cross-sectional view in elevation of the area marked "4" in FIG. 1 showing the seal assisting pressure space adjacent the sealing lip;

FIG. 5 is an enlarged cross-sectional view in elevation of one of the cylindrical members;

FIG. 6 is a cross-sectional view in elevation showing a second embodiment of the invention comprising a three-position valve;

FIG. 7 is a fragmentary cross-sectional view in elevation of a modified liner having seals integral with the liner members; and FIG. 8 is a cross-sectional view in elevation of another embodiment showing the seal members carried by the spool.

DESCRIPTION OF THE PREFERRED EMBODIMENTS

Referring first to the embodiment of FIGS. 1 to 5, the valve is generally indicated at 11 and comprises a body generally indicated at 12, a spool generally indicated at 13, and a liner or spacer-seal assembly generally indicated at 14. Valve 11 is a two-position valve having an inlet port 15, a pair of working ports 16 and 17 on either side of port 15, and a pair of exhaust ports 18 and 19 outside of ports 16 and 17 respectively. Body 12 comprises a bore 21 with which ports 15 through 19 are connected, an end plate 22 at one end of bore 21, and a pilot valve assembly 23 secured at the other end. Ports 15 through 19 have annular grooves 24 formed in bore 21, the groove for inlet port 15 being connected to an axial supply passage 25.

Spool 13 comprises a central land 26, a left-hand end land 27 and a right-hand end land 28, these lands being connected by portions 29 and 31 of reduced diameter. A piston seal 32 is secured to the left-hand end of spool 13 and a helical coil compression spring 33 is disposed between the right-hand end of spool 13 and end plate 22.

Seal 32 is engageable with a cylinder 34 in bore 21, this cylinder forming a chamber 35 connected with the outlet 36 of pilot valve 23. A seal 37 on spool 13 adjacent spring 33 fits within a cylinder 38 in bore 21. Cylinders 34 and 38 have lips 39 (FIG. 5) engageable with their respective lands 27 and 28.

Spacer-seal assembly 14 comprises five members generally indicated at 40, 41, 42, 43 and 44 respectively. Members 41 through 44 are identical and are fabricated of a low friction material such as Teflon made by Dupont Chemical Company, Wilmington, Delaware; polypropylene, polyethylene, polyurethane or any one of a number of nylon plastics. These materials have an extremely low coefficient of friction and also have the flexural and resilient characteristics needed for the purposes set forth below.

Member 40 is shown in detail in FIG. 2. This member is of annular shape and has a plurality of radial ports 45 connected with groove 24 for inlet port 15. The outer portions 46 and 47 of member 40 are recessed to provide space for the retention of O-rings 48 and 49 respectively which engage bore 21. The internal diameter of member 40 is greater than that of spool land 26.

Members 41 and 42 are disposed on opposite sides of member 40. Member 42 is shown in detail in FIG. 3, and comprises an annular member having a plurality of radial ports 51 for connection with groove 24 of port 17. The inner end of member 42 is shown in detail in FIG. 4 and includes a mounting portion 52 and a sealing portion 53. Mounting portion 52 has an outwardly facing groove 54 for the reception of portion 47 of member 40, shoulder 55 of portion 52 retaining O-ring 49. It should be noted that the outside diameter 56 of member 42 is less than the diameter of bore 21, no tight fit being necessary to effect the seal. Sealing portion 53 of member 42 extends axially inwardly therefrom and has an inner flared surface 57 facing spool 13. The radially outer surface 58 of lip 53 is tapered inwardly, creating an annular space 59 between lip 53 and the inner cylindrical surface 61 of member 40. This space will be subjected to pressure from inlet port 15, thereby causing lip 53 to be deflected against land 26 when the latter is disposed therein.

Land 26 is provided with a chamfer 62 facing lip 53 so that the land may enter the lip. Preferably, the juncture 63 (FIG. 4) between chamfer 62 and the cylindrical portion of land 26 is rounded to prevent broaching action during engagement of the land with lip 53. The diameter of the smaller end of surface 62 is less than the unstressed diameter of lip 53, and the diameter of the cylindrical surface of land 26 should be close to this unstressed inner lip diameter.

The construction of seal member 41 is the same as that of member 42 except for the fact that it is the inverse image thereof so as to interfit with the left-hand end of member 40 and retain O-ring 48. Sealing lip 64 of member 41 will engage land 26 when the spool is in its left-hand position as shown in FIG. 1, connecting ports 15 and 17 and also ports 16 and 18. With the spool in its right-hand position lip 53 will engage land 26, reversing the supply and exhaust connections. In both cases the fluid pressure from port 15 will assist the sealing action of the lips.

Spacer seal members 43 and 44 are likewise of symmetrically opposed constructions. Member 44 is provided with a plurality of ports 65 connected with the groove 24 of port 19, and a reduced portion 66 receiving an O-ring 67 which engages bore 21. This reduced portion interfits with a groove 68 in cylinder 38. The inner end of member 44 has a mounting portion 69 which has a groove 71 interfitting with portion 72 of member 42 to retain an O-ring 73 engaging bore 21. A sealing lip 74 on member 44 is constructed similarly to lip 53 of member 42, having a taper which forms a space between portion 72 of member 42 and itself. This space will be exposed to fluid pressure from port 17 when the valve is in its left-hand position as shown in FIG. 1 to assist in engaging land 28, thus separating outlet port 17 from exhaust port 19.

Land 28 is provided with a chamfer 75 similar to chamfer 62 of land 26. This chamfer will permit entry of land 28 into lip 74 with a minimum of resistance.

Member 43 has a pressure assisted lip 76 similar to lip 74 and land 27 is provided with a chamfer 77 for entry into lip 76. It should be noted that both lips 74 and 76 also have chamfered portions 78 and 79 respectively which coact with the chamfers on the spool.

In all cases the sealing portions of members 41 through 44 form annular spaces which are exposed to the pressurized sides of the seals so that the sealing effect will be assisted. Lips 39 of cylinders 34 and 38 are similarly shaped so that any pressure in exhaust ports 18 and 19 will assist their sealing action. For this purpose cylinders 34 and 38 are constructed of material similar to that of members 41 through 44.

The operation of the embodiment of FIGS. 1–5 will be evident from the above description. With the spool in its left-hand position as shown in FIG. 1, sealing lips 64 and 74 will be effective to retain fluid pressure, lips 53 and 76 being inactive. In the opposite position of spool 13, lips 53 and 76 will engage lands 26 and 27 respectively and be pressure assisted toward their sealing positions, with lips 64 and 74 inactive.

FIG. 6 shows a second embodiment of the invention which is generally similar to the first but in which the spool has a third position cutting off flow between all ports. This is useful for example in positioning devices. The unit is indicated generally at 101 and comprises a body generally indicated at 102 and a spool generally indicated at 103. Body 102 is constructed as in the previous embodiment. Spool 103 however has a central land 104 which is wider than land 26 and two end lands 105 and 106 which are somewhat longer than lands 27 and 28 respectively. Two pilot valves 107 and 108 are secured to the opposite ends of body 102, and spool 103 and is provided with springs 109 and 111 at its opposite ends. The spool is therefore capable of being shifted between a left-hand, a right-hand and a central position as shown in FIG. 6 in which it is held by the springs.

A spacer-seal assembly 112 is provided similar to assembly 14 of the previous embodiment. This assembly has four sealing lips 113, 114, 115 and 116. In the central position of spool 103 it will be seen that all four of these sealing lips engage lands on the spools. Pressure will therefore be locked in inlet port 117 as well as working ports 118 and 119. It will be observed that as in the previous embodiment the sealing lips are so directed their sealing action will be assisted by the fluid pressure.

FIG. 7 shows a modified form of liner, generally indicated at 151, which is similar to those of the previous embodiments but in which the bore sealing means is integrally formed with the liner members instead of comprising separate O-rings. More particularly, body 152 has a bore 153 and liner 151 is composed of a central member 154 and a plurality of spacer-seal members generally indicated at 155. Cylinders 156 are disposed at the outer ends of liner 151.

Central member 154 is constructed as in the previous embodiments. Each member 155 has an outer mounting portion 157 and an inner sealing portion 158 at one end thereof and a portion 159 at the other end interfitting with a mounting portion of the adjacent member.

The bore sealing means comprises annular ridges 161 on the mounting portions of spacer-seal members 155 engageable with bore 153. Cylinders 156 may be constructed similarly, with sealing portions 162 and bore sealing means 163. If desired, ridges 161 and 163 may be fabricated of material having a different hardness than the members 155 and 156, respectively, of which they form part. This may be done by an injection molding machine such as that manufactured, for example, by Gries Reproducer Co., New Rochelle, New York.

FIG. 8 shows another embodiment of the invention generally indicated at 201 and comprising a body generally indicated at 202 and a spool generally indicated at 203.

Body 202 has a central inlet port 204, a pair of outlet ports 205 and 206 and exhaust ports 207 and 208 outwardly of the outlet ports. A land 209 is disposed between ports 204 and 205 and a land 211 between ports 204 and 206. Similarly, lands 212 and 213 are disposed between the outlet and exhaust ports. These lands are of cylindrical shape, having the same diameter.

Spool 203 comprises a rod 214 on the opposite end of which are mounted a pair of pistons 215 and 216. These pistons are disposed within cylinders 217 and 218 respectively, the cylinders being alternately pressurizable to shift the spool.

Four sealing members generally indicated at 219, 221, 222 and 223 respectively are mounted on rod 214. More specifically, these members are held by spacers 224, 225, 226 and 227, the spacers being clamped together by nuts 228 and 229.

Each sealing member 219 through 223 has a mounting portion 231 secured between a pair of spacers 224 through 227 and a sealing portion 232 outwardly thereof. An annular groove 233 is disposed between the mounting and sealing portions and is exposed to the pressurized side of the seal. Sealing portion 232 has a tapered shape, its outer end 234 being of lesser diameter in its unstressed condition than that of lands 209 through 213. Thus, shifting of the spool will cause the sealing portions to enter the lands where they will be assisted by pressure to perform their sealing function.

What is claimed is:

1. In a valve assembly, a body having an inlet port, an outlet port and an exhaust port, a bore in said body connected with said ports, a spool in said bore having a plurality of lands and portions of reduced diameter therebetween and shiftable to connect either the inlet or exhaust port with the outlet port, and a spacer-seal assembly comprising a plurality of stacked spacer-seal members surrounding said spool, each member having an outer mounting portion and an inner sealing portion at one end thereof forming a groove therebetween and a portion at the other end thereof interfitting with and engaging said groove of the adjacent member, bore sealing means at said interfitting portions, said sealing portion of each spacer-seal member comprising a lip engageable with a land on the spool, the lip being shaped to provide a chamber receiving fluid pressure to assist in the sealing action, said lands having chamfers for permitting free entrance into said sealing lips, all said portions of each spacer-seal member being integrally formed as part of a unitary annular element, said element being fabricated of low-friction material having rigidity such that said interfitting portions will maintain the axial spacing of adjacent members but being sufficiently resilient to allow said lip to be deflected against a land when the latter is disposed therein.

2. The combination according to claim 1, the outer portions of the chamfers being rounded.

3. The combination according to claim 1, said bore sealing means comprising O-rings retained by said interfitting portions of the spacer-seal members.

4. In a valve assembly, a body having an inlet port, an outlet port and an exhaust port, a bore in said body connected with said ports, a spool in said bore having a plurality of lands and portions of reduced diameter therebetween and shiftable to connect either the inlet or exhaust port with the outlet port, and a spacer-seal assembly comprising a plurality of stacked spacer-seal members surrounding said spool, each member having an outer mounting portion and an inner sealing portion at one end thereof and a portion at the other end thereof interfitting with a mounting portion of the adjacent member, bore sealing means at said interfitting portions, said bore sealing means comprising annular ridges formed on the mounting portions of said spacer-seal members, said sealing portion of each spacer-seal member comprising a lip engageable with a land on the spool, the lip being shaped to provide a chamber receiving fluid pressure to assist in the sealing action.

5. In a valve assembly, a body having a central inlet port, a pair of outlet ports on opposite sides of said inlet port, and a pair of exhaust ports outwardly of said outlet ports, a bore in said body, a valve spool in said bore having a central land and a pair of end lands, means for shifting said spool between opposite end positions connecting either outlet port with the inlet port and the other outlet port to the exhaust port, and a spacer-seal assembly between said spool and body comprising a central member having radial ports connected with the inlet port and end portions of reduced diameter, a first pair of spacer-seal members on opposite sides of said central member and having mounting portions interfitting with said reduced portions of the central member, sealing portions inwardly of said mounting portions and engageable with said central land, spaces formed adjacent said sealing portions for permitting fluid pressure at said inlet port to assist the sealing action, a second pair of spacer-seal members outwardly of the first pair and having mounting portions interfitting with reduced end portions of the first pair of spacer-seal members, sealing portions on said second pair of spacer-seal members engageable with the end lands of said spool, spaces adjacent said last-mentioned sealing portions exposed to the outlet ports for assisting the sealing action, all four of said spacer-seal members being fabricated of a low-friction resilient material and having radial openings connected with their adjacent ports, the first pair of sealing portions being disposed between the inlet and outlet ports and the second pair between the outlet and exhaust ports, and O-rings held between the mounting portions of said spacer-seal members and engaging said body bore.

6. The combination according to claim 5, said seal-assisting spaces being formed by tapered surfaces on said sealing portions.

7. The combination according to claim 5, further provided with cylindrical members at the opposite ends of said spacer-seal assembly and having grooves interfitting with the ends thereof.

8. The combination according to claim 5, further provided with means for holding said spool in a central position, said central land being of sufficient length as to be engaged by both of said first pair of sealing portions when the spool is in said central position with the end lands being engaged by said second pair of sealing portions, whereby fluid will be locked in both outlet ports.

* * * * *